(12) United States Patent
Strom

(10) Patent No.: US 9,574,607 B2
(45) Date of Patent: Feb. 21, 2017

(54) ROLLER OF A SUPPORT ARRANGEMENT FOR A ROTARY MILKING PLATFORM

(71) Applicant: DELAVAL HOLDING AB, Tumba (SE)

(72) Inventor: Mikael Strom, Tumba (SE)

(73) Assignee: DELAVAL HOLDING AB, Tumba (SE)

( * ) Notice: Subject to any disclaimer, the term of this patent is extended or adjusted under 35 U.S.C. 154(b) by 120 days.

(21) Appl. No.: 14/435,482

(22) PCT Filed: Nov. 6, 2013

(86) PCT No.: PCT/SE2013/051298
§ 371 (c)(1),
(2) Date: Apr. 14, 2015

(87) PCT Pub. No.: WO2014/074058
PCT Pub. Date: May 15, 2014

(65) Prior Publication Data
US 2015/0260224 A1    Sep. 17, 2015

Related U.S. Application Data

(60) Provisional application No. 61/723,374, filed on Nov. 7, 2012.

(30) Foreign Application Priority Data

Nov. 7, 2012    (SE) ........................................ 1251262

(51) Int. Cl.
*F16C 33/34*    (2006.01)
*A01K 1/12*    (2006.01)

(52) U.S. Cl.
CPC ............... *F16C 33/34* (2013.01); *A01K 1/126* (2013.01)

(58) Field of Classification Search
CPC ................................. F16C 33/34; A01K 1/126
(Continued)

(56) References Cited

U.S. PATENT DOCUMENTS

| 160,462 A | 3/1875 | Palmer |
| 535,990 A | 3/1895 | Lowe |

(Continued)

FOREIGN PATENT DOCUMENTS

| AU | 671483 B | 8/1996 |
| BE | 529 742 A | 7/1957 |

(Continued)

OTHER PUBLICATIONS

International-Type Search Report, dated May 8, 2013, from corresponding PCT application.

(Continued)

*Primary Examiner* — Stanton L Krycinski
(74) *Attorney, Agent, or Firm* — Young & Thompson

(57) ABSTRACT

A roller of a support arrangement includes a first unit and a second unit releasably connected to each other via a connection mechanism, the first unit including a first side flange as well as an entire peripheral contact surface of the roller, and the second unit including a second side flange of the roller. In a mounted state, the peripheral contact surface is in contact with a contact portion of a first rail member connected to a rotary platform, and a contact portion of a stationary second rail member, with the two side flanges arranged on opposite sides of the contact surface. A plurality of the rollers is arranged in a vertical space between the first and second rail members.

19 Claims, 3 Drawing Sheets

(58) Field of Classification Search
USPC ..................................................... 119/14.04
See application file for complete search history.

(56) References Cited

U.S. PATENT DOCUMENTS

| | | | |
|---|---|---|---|
| 1,566,492 A | 12/1925 | McGinness | |
| 3,103,912 A * | 9/1963 | Benedetto | A01K 1/126 119/14.04 |
| 3,261,323 A * | 7/1966 | Steelhammer | A01K 1/126 119/14.04 |
| 3,738,477 A * | 6/1973 | Gename | B65G 9/002 105/150 |
| 3,759,190 A * | 9/1973 | Harvey | B61B 13/04 105/150 |
| 3,759,225 A * | 9/1973 | Galbraith | A01K 1/126 119/14.04 |
| 3,765,373 A * | 10/1973 | Phillips | A01K 1/126 119/14.04 |
| 3,860,171 A * | 1/1975 | Mastronardi | A47B 53/02 238/148 |
| 5,782,738 A | 7/1998 | Bowers | |
| 6,189,288 B1 * | 2/2001 | Bowers | A01K 1/12 52/742.14 |
| 6,205,929 B1 | 3/2001 | Van Dyke et al. | |
| 7,640,888 B2 * | 1/2010 | Holscher | A01K 1/126 119/14.04 |
| 7,984,692 B2 * | 7/2011 | Chapman | A01K 1/126 119/14.04 |
| 8,051,801 B2 * | 11/2011 | Oliver | A01K 1/126 119/14.04 |
| 8,117,988 B2 * | 2/2012 | Oliver | A01K 1/126 119/14.04 |

FOREIGN PATENT DOCUMENTS

| | | | | |
|---|---|---|---|---|
| DE | 32 36 838 A1 | | 4/1984 | |
| DE | 201 06 481 U1 | | 7/2001 | |
| GB | 1398596 A | * | 6/1975 | ............ A01K 1/126 |
| GB | 1459399 A | * | 12/1976 | ............ A01K 1/126 |
| NZ | WO 2007117162 A2 | * | 10/2007 | ............ A01K 1/126 |
| RU | 2 028 776 C1 | | 2/1995 | |
| SE | WO 2015167390 A1 | * | 11/2015 | ............ A01K 1/126 |
| SU | 1356996 A1 | | 12/1987 | |
| SU | 1493188 A1 | | 7/1989 | |
| WO | 2011/091530 A1 | | 8/2011 | |

OTHER PUBLICATIONS

International Search Report, dated Jan. 24, 2014, from corresponding PCT application.

Supplementary International Search Report, dated Sep. 5, 2014, from corresponding PCT application.

* cited by examiner

ROLLER OF A SUPPORT ARRANGEMENT FOR A ROTARY MILKING PLATFORM

THE BACKGROUND OF THE INVENTION AND PRIOR ART

The present invention relates to a roller of a support arrangement for a rotary milking platform, wherein the support arrangement comprises a first rail member fixedly connected to the rotary platform, a second rail member stationarily arranged in a position below the platform, and a plurality of rollers arranged in a vertical space between the first rail member and the second rail member. The roller is one of said plurality of rollers, and comprises a peripheral contact surface to be in contact with the first rail member and the second rail member, and two side flanges arranged on opposite sides of the peripheral contact surface, wherein each side flange comprises a peripheral surface arranged at a longer radial distance from a rotation axis of the roller than the peripheral contact surface.

A support arrangement for a rotary milking platform has the tasks to support the platform, allow rotation of the platform, and maintain the platform in a position such that it rotates around a fixed centre vertical axis. The rollers support and allow rotation of the upper rail and the rotary platform on the lower stationary rail. Furthermore, the side flanges control the motion of the upper rail and the rotary platform in a horizontal plane such that the platform performs a rotary motion around a fixed vertical axis with a very good accuracy. Such a support arrangement may have a simple and reliable design.

However, certain rollers wear out faster than others, and it is desirable to be able to exchange individual rollers when they are worn out. However, it is difficult and time consuming to exchange the rollers in such a support arrangement. The upper rail and the lower rail prevent dismounting and mounting of the rollers in upward and downward vertical directions, and the side flanges prevent dismounting and mounting of the rollers in transverse directions. It is many times necessary to lift the platform and increase the vertical space between the rails for allowing exchange of the rollers. In practice, such a comprehensive measure is not performed for exchanging a few worn out rollers in the support arrangement. Instead, a part of one of the rail members is often cut out and welded back into place in order to allow exchange of a roller.

SUMMARY OF THE INVENTION

The object of the present invention is to provide a roller in a support arrangement of a rotary milking platform which is exchangeable in a simple manner.

This object is achieved by the initially defined roller, which is characterised in that it comprises a first unit and a second unit, and a connection mechanism configured to releasably connect the first unit and the second unit to each other, wherein the first unit comprises the first side flange as well as the entire contact surface of the roller, and the second unit comprises the second side flange of the roller. Consequently, the roller comprises two releasably connected units. In case a roller is to be dismounted, the connection mechanism is released such that the roller is divided into the two separate units. The first unit has a first side flange preventing dismounting of the roller in a first transverse direction, and the second unit has a second side flange preventing dismounting of the roller in an opposite second transverse direction. However, it is possible to move the released first unit out from the vertical space between the rail members in the second transverse direction. In a corresponding manner, it is possible to move the released second unit out from the vertical space between the rail members in the first transverse direction.

When a worn out roller has been dismounted, the mounting process of a new roller may be performed in the following manner. A first unit of the new roller is moved in a transverse direction to an intended operating position in the vertical space between the rail members from one side of the rail members. A second unit of the new roller is moved in a transverse direction to an intended operating position in the vertical space between the rail members from an opposite side of the rail members. When the units have been placed in these positions in contact with each other, they are connected to each other by means of the connection mechanism. Such a dismounting process of a worn out roller and mounting process of a new roller may be performed in a relatively simple manner. Thus, there is no need to lift the platform or cut out a part of one of the rail members when rollers are to be exchanged. Since the first unit comprises the entire peripheral contact surface of the roller, the contact surface will be a continuous surface without overlaps between the units. Such a roller will be more durable, and can perform a continuous and smooth rotary motion of the platform substantially without vibrations.

According to an embodiment of the invention, the releasable connection comprises a screw mechanism. It is easy to connect the units to each other and release the units from each other by means of a suitable screw mechanism. The roller may comprise a mounting hole configured to receive the screw mechanism, wherein the first unit comprises a first part of the mounting hole and the second unit comprises a second part of the mounting hole. The screw mechanism may comprise an elongated screw member such as a bolt which is arranged in the mounting hole. It is here possible to connect the units and release the units by means of a rotary motion of the bolt. Alternatively, the bolt may have a threaded end portion engaged by a nut.

According to a further embodiment of the invention, the mounting hole extends in an axial direction of the roller between a first side surface formed by the first unit and a second side surface formed by the second unit of the roller. A screw mechanism arranged in such a mounting hole may move the units together in an axial direction of the roller and allow a releasing motion of the units in an opposite axial direction. Preferably, the roller has a suitable number of mounting holes symmetrically arranged with openings in the side surfaces of the roller.

According to a further embodiment of the invention, at least one of the first side surface and the second side surface comprises a depression configured to receive an end portion of the screw mechanism. The end portions of the screw mechanism may be a head of a bolt or a nut. In this case, the end portions of the screw mechanism may be arranged in an immersed position in the depressions. Thereby, the end portions of the screw mechanism will not protrude from the side surfaces of the roller.

According to a further embodiment of the invention, the first unit and the second unit are provided with contact portions to be in contact with each other when the units are in a connected state, wherein the contact portions have a shape such that a separation movement of the units is only allowed in an axial direction of the roller. An axial direction of the roller corresponds to a transverse direction of the roller. Since the units are only movable to and from the vertical space between the rail members in an axial transverse direction, such contact portions do not influence on the dismounting process and the mounting process of the units. The contact portions may guide the units to a correct position in relation to each other. Furthermore, the contact portions may hold the units loosely together in a mounting position in order to simplify the connection process of the connection mechanism. One of the units may comprise a contact portion in the form of a recess portion and the other unit may comprise a contact portion in the form of a protruding portion having a corresponding shape as the recess portion.

During a mounting process, the protruding portion is moved into the recess portion. The protruding portion and the recess portion may be cylindrically-shaped portions arranged symmetrically around a rotation axis of the roller.

According to a further embodiment of the invention, the roller comprises a centre hole configured to receive a non-rotatable shaft defining a rotation axis of the roller. In this case, the roller rotates around the non-rotatable shaft. Such a roller may have a simple design. In this case, the ends of the shaft have fixed connections to suitable components arranged on opposite sides of the roller. Alternatively, the roller and the shaft are formed as a rotary unit. In this case, the shaft has to be rotatably arranged on opposite sides of the roller. The first unit may comprise a first part of the centre hole and the second unit may comprise a second part of the centre hole. In this case, the units may rotate side by side in a connected state around the shaft.

According to a further embodiment of the invention, the centre hole is configured to receive a shaft connecting the roller to two elongated connection element arranged on opposite sides of the rollers. Such connection elements may constitute a connection between all or some of the rollers in the support arrangement. The connection element may have a corresponding extension as the rail members such that all rollers in the support arrangement are connected to each other, either as one circular element or as a number of interconnected elements which each extends between only a few of the rollers. Preferably, the rollers are connected to the connection element or elements at constant intervals around the whole circular support arrangement.

According to a further embodiment of the invention, the shaft is connected to the connection elements by means of a releasable connection. It is usually necessary to remove the shaft before the separated units of the roller can be dismounted. The shaft may be a bolt which is releasably connected by means of a nut. Such a shaft allows a simple mounting and dismounting.

According to a further embodiment of the invention, at least one of the first unit and the second unit is manufactured of a material body in one piece. The units may be performed of a homogeneous body of a wear resistant material. At least one of the first unit and the second unit may be manufactured of a nylon material. Nylon rollers have excellent impact resistance, good load capacity, good chemical resistance, low coefficient of friction, good vibration absorbing properties and they can be manufactured at a low cost. Preferably, the first unit and the second unit are manufactured in the same material. In this case, the roller may obtain the same properties as a roller in one piece manufactured in the same material.

BRIEF DESCRIPTION OF THE DRAWINGS

The present invention is now to be explained more closely by means of a preferred embodiment, which is disclosed as an example, and with reference to the attached drawings.

BRIEF DESCRIPTION OF A PREFERRED EMBODIMENT OF THE INVENTION

Figure 1:
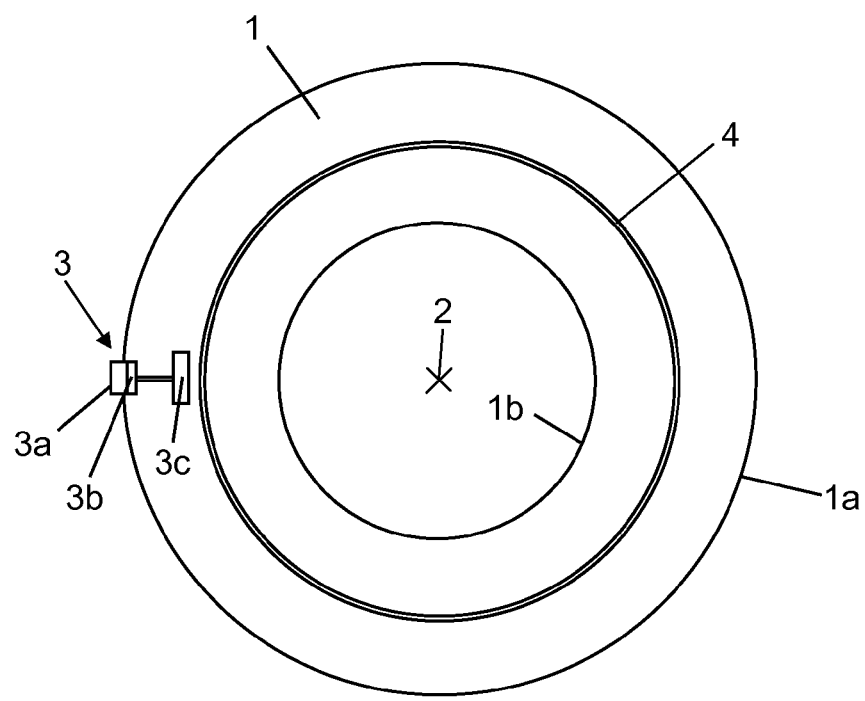
FIG. 1 shows a view of a rotary milking platform from below.

FIG. 1 shows a rotary milking platform 1 for milking of cows, from below. The platform 1 is rotatably arranged around a vertical axis 2. The platform 1 has an outer edge portion 1a and an inner edge portion 1b. The platform 1 is driven by a drive unit 3. The drive unit 3 comprises an electric motor 3a, an integrated reduction gear box 3b and a drive wheel 3c mounted in contact with a lower surface of the platform 1. The drive wheel 3c may be a pneumatic tyre. Such a drive wheel 3 makes the drive unit shock resistant as the tyre provides a cushioning effect. The drive unit 3 has a smooth start and stop action. The drive unit 3 may be infinitely variable in speed in either a clockwise or counter-clockwise direction. A first circular rail member 4 is fixedly attached to a lower surface of the platform 1. The first circular rail member 4 may by attached to the platform by welding. The first circular rail member 4 may be directly connected to a lower surface of the platform 1 or indirectly via a suitable connection. The first rail member 4 is a part of a support arrangement for the platform 1.

Figure 2:
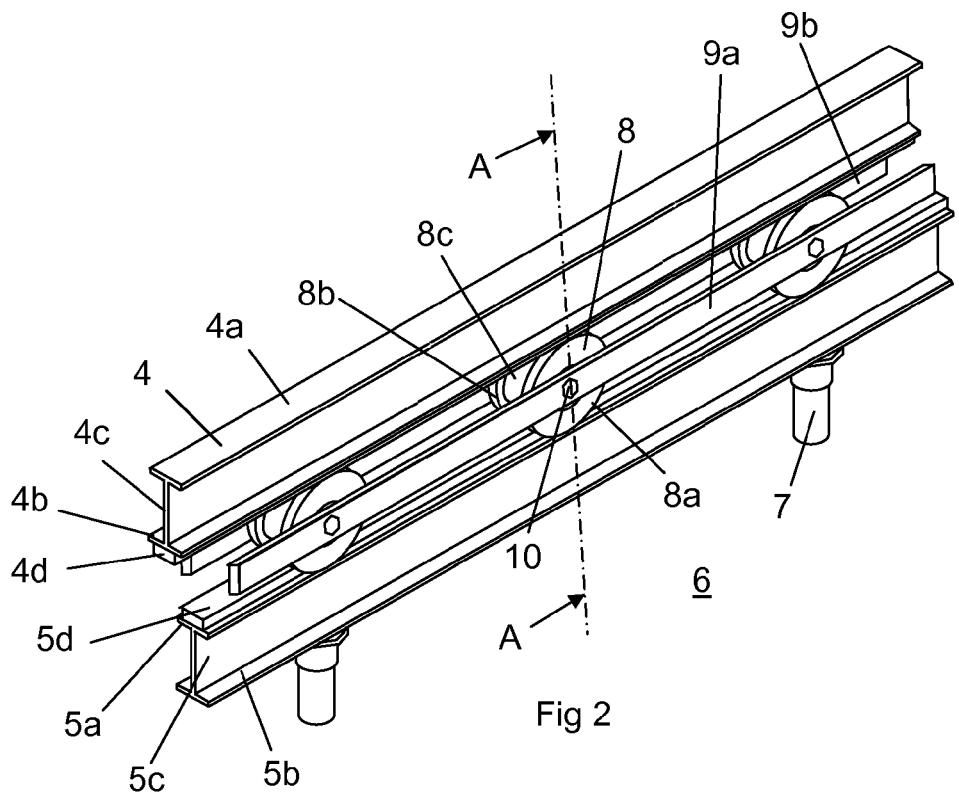
FIG. 2 shows a perspective view of a part of a support arrangement of the platform according to the invention.

FIG. 2 shows a part of the support arrangement in more detail. The first circular rail member 4 comprises a beam with an I-shaped cross section. The first circular rail member 4 comprises an upper horizontal portion 4a, a lower horizontal portion 4b and a vertical portion 4c connecting the upper horizontal portion 4a and the lower horizontal portion 4b. The first circular rail member 4 comprises an elongated contact portion 4d mounted on a lower surface of the lower horizontal portion 4b. The contact portion 4d may be welded to the lower horizontal portion 4b. The support arrangement comprises a second circular rail member 5 arranged on a stationary surface 6 below the rotary platform 1 by means of a suitable number of support legs 7. The second rail member 5 also comprises a beam with an I-shaped cross section. The second rail member 5 comprises an upper horizontal portion 5a, a lower horizontal portion 5b and a vertical portion 5c connecting the upper horizontal portion 5a and the lower horizontal portion 5b. The second rail member 5 also comprises a contact portion 5d mounted on an upper surface of the upper horizontal portion 5a. The contact portion 5d may be welded to the upper horizontal portion 5a. The second rail member 5 is arranged vertically below the first circular rail member 4.

The support arrangement comprises a number of rollers arranged in a vertical space between the first circular rail member 4 and the second circular rail member 5. Each roller 8 is provided with a peripheral surface defined by a first side flange 8a, a second side flange 8b and a peripheral contact surface 8c arranged between the side flanges 8a, 8b. A first elongated connection element 9a and a second elongated connection element 9b are arranged on opposite sides of the roller 8. The connection elements 9a, 9b have a corresponding circular extension as the rail members 4, 5, either as circular elements or each as a number of interconnected elements which each extends between only a few of the rollers. The connection elements 9a, 9b are provided with holes at constant intervals. The rollers are rotatably arranged around bolts 10 arranged in said holes. The distance between two adjacent holes of the elongated connection elements 9a, 9b defines the distance between two adjacent rollers 8.

Figure 3:
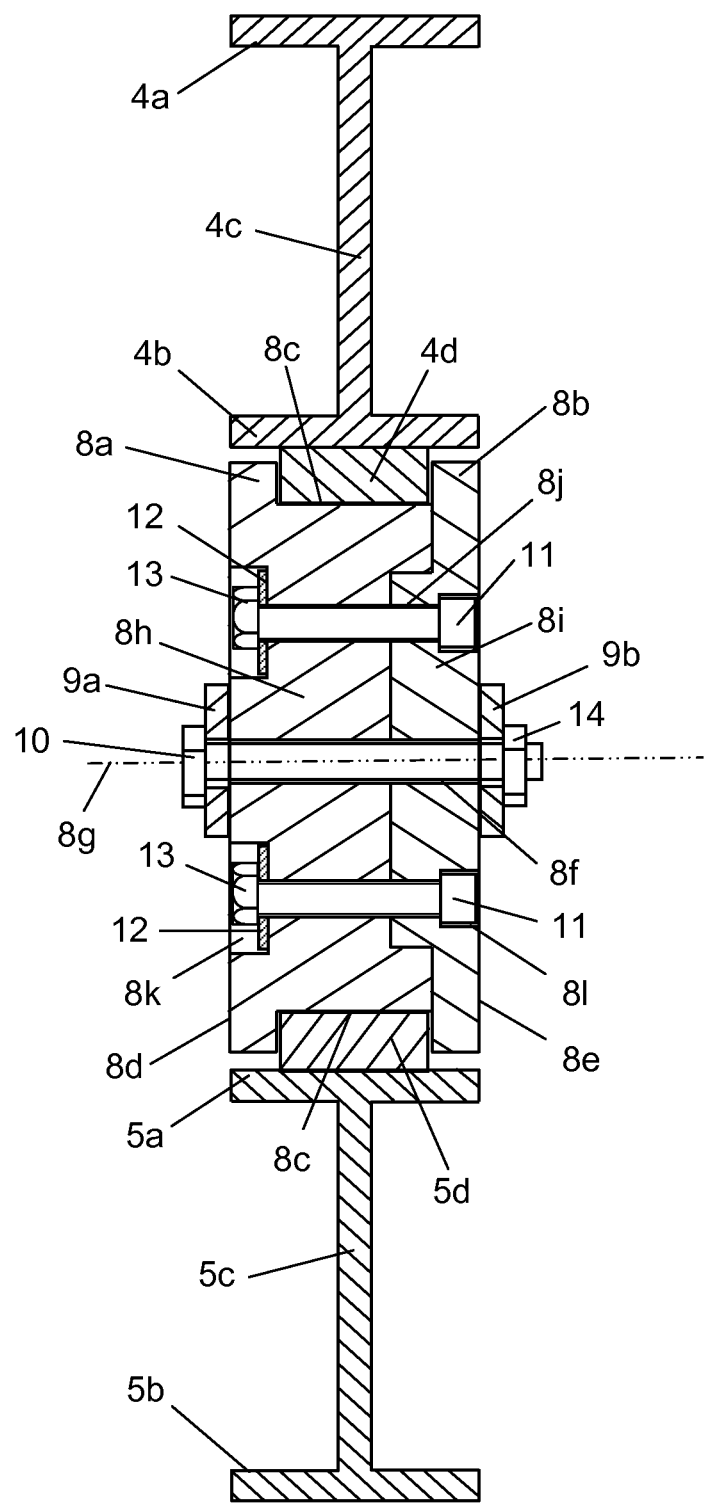
FIG. 3 shows a sectional view of the support arrangement in FIG. 2 along the plane A-A.

FIG. 3 shows a cross section view of the support arrangement and one of the rollers in FIG. 2. The roller 8 comprises a first side surface 8d and a second side surface 8e. The roller 8 comprises a centrally arranged hole 8f extending between the side surfaces 8d, 8e. The centre hole 8f defines a rotation axis 8g of the roller 8. The peripheral contact surface 8c of the roller 8 is in contact with a lower surface of the contact portion 4d of the first rail member 4 and an upper surface of the contact portion 5d of the second rail member 5. The peripheral contact surface 8c of the roller 8 is located at a smaller radial distance from the rotation axis 8g than a peripheral surface of the first side flange 8a and a peripheral surface of the second side flange 8b. Thus, at least a part of the contact portions 4d, 5d of the rail members 4, 5 are located in a space between the side flanges 8a, 8b of the roller 8. During rotation of the platform 1, the side flanges 8a, 8b prevent side movements of the first rail member 4 and the platform 1 in relation to the rolling member 8 and the stationary rail member 5. The side flanges 8a, 8b position the first rail member 4 vertically above the second rail member 5 and the platform 1 in a horizontal plane such that it rotates around the fixed vertical axis 2.

The platform 1 is heavy and the load on the rollers is high. After a certain time of operation, the rollers are worn out. Some rollers are worn out faster than others. In order to allow a relatively simple exchange of a worn out roller 8, it is formed by two separate units, namely a first unit 8h and a second unit 8i. The units 8h, 8i are releasably connected to each other by means of screw mechanisms. In this case, four mounting holes 8j are arranged in the roller 8. A screw mechanism is arranged in each mounting hole 8j. The mounting holes 8j extend in an axial direction of the roller 8 between the side surfaces 8d, 8e. The mounting holes 8j are symmetrically arranged at a similar distance from the rotation axis 8 of the roller 8. The mounting holes 8j are arranged in parallel with the rotation axis 8g of the roller 8.

Each screw mechanism comprises a mounting bolt 11, a washer 12 and a nut 13. The first unit 8h comprises a depression 8k at an opening of each mounting holes 8j in the first side surface 8d. The washers 12 and the nuts 13 are immersed in the depressions 8k. The second unit 8h also comprises depressions 8l at an opening of each mounting hole 8j on the second side surface 8e of the roller 8. The heads of the bolts 11 are immersed in these depressions 8l. Because of the depressions 8k, 8l, the first side surface 8d and the second side surface 8e have no protruding portions which risk to come in contact with the elongated connection elements 9a, 9b during rotation of the roller 8.

The roller 8 is rotatably arranged around a non-rotatable shaft in the form of the centre bolt 10. The centre bolt 10 has a head arranged outside the first elongated element 9a. The centre bolt 10 has an elongated body extending through a hole in the first elongated element 9a, the centre hole 8f of the roller 8 and a hole in the second elongated element 9b. The centre bolt 10 is fastened by means of a nut 14 arranged on the outside of the second elongated element 9b.

Figure 4:
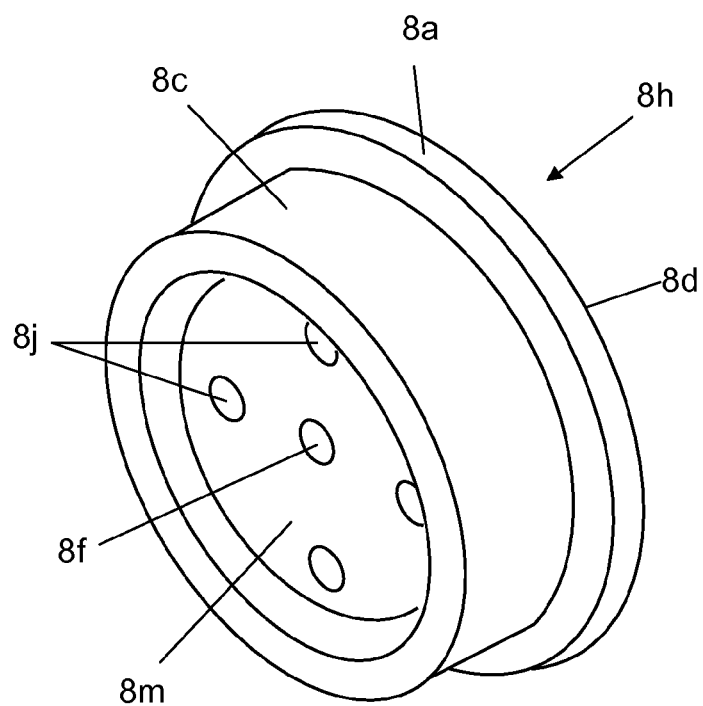
FIG. 4 shows the first part of a roller in FIG. 3

FIG. 4 shows a separate view of the first unit 8h. The first unit 8h is manufactured in one piece of a homogeneous wear resistant material such as a nylon material. The first unit 8h comprises the first side surface 8d of the roller 8, the first side flange 8a of the roller 8 and the entire peripheral contact surface 8c of the roller 8. The first unit 8h comprises a cylindrically-shaped recess portion 8m at an opposite side to the first side portion 8d. The first unit 8h also comprises a first part of the centre hole 8d which has an opening in a centre position of a bottom surface of the recess portion 8m. Furthermore, the first unit 8h comprises a first part of the mounting holes 8j. The first part of the mounting holes 8j are constituted by openings in the bottom surface of the recess portion 8m at a distance from the centre hole 8f.

Figure 5:
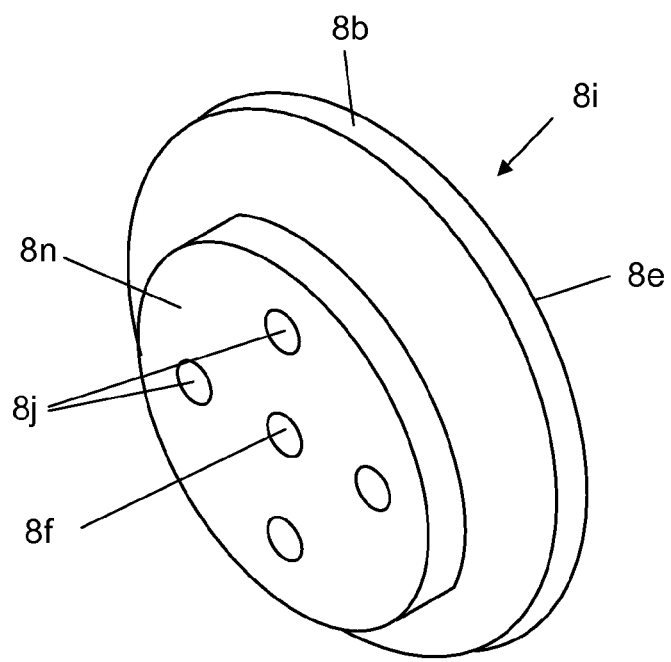
FIG. 5 shows the second part of a roller in FIG. 3.

FIG. 5 shows a separate view of the second unit 8i. The second unit 8i is manufactured in one piece of a homogeneous wear resistant material such as a nylon material. The second unit 8i comprises the second side surface 8e of the roller 8 and the second side flange 8b of the roller 8. The second unit 8i comprises a cylindrically-shaped protruding portion 8n at an opposite end to the second side surface 8e. The protruding portion 8n has a shape corresponding to the recess portion 8m of the first unit 8h. The second unit 8i also comprises a second part of the centre hole 8f and a second part of each of the mounting holes 8j. The second part of the centre hole 8f and the second part of the mounting holes 8j are constituted by openings in an upper surface of the protruding portion 8n.

A worn out roller 8 can be exchanged in the following manner. Initially, the centre nut 14 of the roller 8 is unscrewed and detached from the centre bolt 10. The centre bolt 10 is then removed from the centre hole 8f such that the roller 8 is released from the elongated elements 9a, 9b. The nuts 13 are then unscrewed and removed such it is possible to remove the bolts 11 from the mounting holes 8j. The connection between the units 8h, 8i is now released. Since the second unit 8i only comprises one of the side flanges 8b, it is possible to move it in a transverse axial direction of the roller 8 to the right in FIG. 3 and out of engagement with the first unit 8h. The elongated elements 9a, 9b are relatively flexible in a lateral direction such they do not prevent the releasing movement of the second unit 8i from the first unit 8h. Alternatively, the elongated elements comprise a number of interconnected elements which each extends between only a few of the rollers, and one such element could then be removed in order to allow the releasing movement of the second unit 8i from the first unit 8h. When the second unit 8i has been removed, the first unit 8h is moved in a transverse axial direction to the left in FIG. 3 and out of engagement with the contact portions 4d, 5d of the circular rail members 4, 5. A force of a suitable kind may be applied to the first unit 8h for moving the contact surface 8c out of engagement with the contact portions 4d, 5d of the circular rail members 4, 5.

The mounting process of a new roller 8 may be performed in the following manner. Initially, the peripheral contact surface 8c of the first unit 8h of the new roller 8 is moved to a position between the contact portions 4d, 5d of the rail members 4, 5. The second unit 8i is then moved towards the first unit 8h from an opposite side of the rail members 4, 5. The protruding portion 8n of the second unit 8i is moved into the recess portion 8m of the first unit 8h. The first part of the centre hole 8f in the first unit 8h and the second part of the centre hole 8f in the second unit 8i obtains automatically a coaxial position in relation to each other by means of the recess portion 8m and the protruding portion 8n. However, the second unit 8i has to be set in a turning position in which the mounting holes 8j in the units 8h, 8i obtains a coaxial position in relation to each other. The mounting bolts 11 are then arranged in the mounting holes 8j. A washer 12 and a nut 13 are arranged on the respective free end of the bolts 11. The nut 13 is tightened with a torque by a tool such that the first unit 8h and the second unit 8i are securely connected to each other. Thereafter the centre bolt 10 is arranged in the hole $9a_1$ through the first connection element 9a, the centre hole 8f through the units 8h, 8i and the hole $9b_1$ through the second connection element 9b. The centre nut 14 is placed on the free end of the centre bolt 10 and tightened by a tool with a suitable torque.

The invention is not restricted to the described embodiment in the figures, but may be varied freely within the scope of the claims. For example, the rail members may be circular or have any other suitable shape. They may be continuous around the platform or be constituted by segments.

The invention claimed is:

1. A roller (8) of a support arrangement for a rotary milking platform (1), the support arrangement including a first rail member (4) connected to a rotary platform and a stationary second rail member (5), the first and second rail members each including a contact portion (4d, 5d), the roller comprising:
   a first unit (8h) including a first side flange (8a) and an entirety of a peripheral contact surface (8c) of the roller;
   a second unit (8i) a second side flange (8b); and
   a connection mechanism (10, 11, 13, 14) that, in a connected state of the first and second units, releasably connects the first unit to the second unit;
   wherein, in the connected state, a rotation axis is common to the first and second units,
   wherein each of the first and second side flanges (8a, 8b) comprises a peripheral surface arranged at a longer radial distance from the rotation axis (8g) than a radial distance between the peripheral contact surface (8c) and the rotation axis (8e), and
   wherein, in a mounted state, the peripheral contact surface (8c) is in contact with i) the contact portion (4d) of the first rail member and ii) the contact portion (5d) of the second rail member, with the first and second side flanges arranged on opposite sides of the contact surface.

2. The roller of claim 1 in combination with the support arrangement, wherein,
   the first rail member (4) is fixedly connected to the platform (1),
   the second rail member (5) is stationarily arranged in a position below the platform (1), and
   in the mounted state, a plurality of said roller is arranged in a vertical space between the first rail member (4) and the second rail member (5) with the peripheral contact surface (8c) of each said roller in contact with i) the contact portion (4d) of the first rail member and ii) the contact portion (5d) of the second rail member, with the first and second side flanges arranged on opposite sides of the contact surface.

3. The roller according to claim 1, wherein the connection mechanism comprises a screw mechanism (11, 13).

4. The roller according to claim 3, wherein each of the first and second units comprises a mounting hole (8j) that receives the screw mechanism, with the first unit (8h) comprising a first part of the mounting hole and the second unit comprising a second part of the mounting hole.

5. The roller according to claim 4, wherein said mounting hole (8j) extends in an axial direction of the roller (8) between a first side surface (8d) formed by the first unit (8h) and a second side surface (8e) formed by the second unit (8i).

6. The roller according to claim 1, wherein the first unit (8h) and the second unit (8i) are provided with contact portions (8m, 8n) that, in the connected state, contact with each other.

7. The roller according to claim 6, wherein the contact portions (8m, 8n) have a shape such that a separation movement of the units (8h, 8i) is only allowed in an axial direction of the roller (8).

8. The roller according to claim 6, wherein the contact portion of one of the first and second units is in a form of a recess portion (8m) and the contact portion of another of the first and second units is in a form of a protruding portion (8n) having a corresponding shape as the recess portion (8m).

9. The roller according to claim 1, wherein each of the first and second units have a center hole (8f) at the rotation axis (8g).

10. The roller according to claim 9, wherein the connection mechanism comprises two elongated connection elements (9a, 9b) arranged on opposite sides of the first and second units, and a shaft (10) extending through the center holes of the first and second units and through the two elongated connection elements (9a, 9b).

11. The roller according to claim 10, wherein the shaft (10) is connected to the two connection elements (9a, 9b) by a releasable connection (14).

12. The roller according to claim 11, wherein the shaft is a bolt (10) and the releasable connection is a nut (14).

13. The roller according to claim 1, wherein at least one of the first unit (8h) and the second unit (8i) is manufactured of a material body in one piece.

14. The roller according to claim 13, wherein the at least one of the first unit (8h) and the second unit (8i) is manufactured of a nylon material.

15. The roller according to claim 1, wherein the first unit (8h) and the second unit (8i) are manufactured of the same material.

16. The roller of claim 1 in combination with the support arrangement, wherein,
   the first rail member (4) is fixedly connected to the platform (1),
   the second rail member (5) is stationarily arranged in a position below the platform (1), and
   in the mounted state, a plurality of said roller is arranged in a vertical space between the first rail member (4) and the second rail member (5) with the peripheral contact surface (8c) of each said roller in contact with i) the contact portion (4d) of the first rail member and ii) the contact portion (5d) of the second rail member, with the first and second side flanges arranged on opposite sides of the contact surface,
   each said first unit has a first outer side surface (8d) and each said second unit has a second outer side surface (8e),
   each of the first and second units have a center hole (8f) at the rotation axis (8g),
   the connection mechanism comprises i) two elongated connection elements (9a, 9b), each elongated connection element having plural holes spaced along a length direction, the two elongated connection elements respectively arranged on opposite sides of the first and second outer side surfaces (8d, 8e) of the first and second units, ii) a shaft (10) extending through the center holes of the first and second units and through corresponding holes of the two elongated connection elements (9a, 9b), and iii) a releasable connection (14) that releasably connects the shaft (10) to the two connection elements (9a, 9b), and the two elongated connection elements extend between plural of said rollers and connect the plural rollers to each other.

17. The combination of claim 16, wherein, the connection mechanism further comprises a screw mechanism (11, 13), each of the first and second units comprises a mounting hole (8*j*) that receives the screw mechanism, with the first unit (8*h*) comprising a first part of the mounting hole and the second unit comprising a second part of the mounting hole, said mounting hole (8*j*) extends in an axial direction of the roller (8) between the first side surface (8*d*) formed by the first unit (8*h*) and the second side surface (8*e*) formed by the second unit (8*i*).

18. The combination of claim 16, wherein, the first unit (8*h*) and the second unit (8*i*) are provided with contact portions (8*m*, 8*n*) that, in the connected state, contact with each other, the contact portions (8*m*, 8*n*) have a shape such that a separation movement of the units (8*h*, 8*i*) is only allowed in an axial direction of the roller (8), and the contact portion of one of the first and second units is in a form of a recess portion (8*m*) and the contact portion of another of the first and second units is in a form of a protruding portion (8*n*) having a corresponding shape as the recess portion (8*m*).

19. The combination of claim 17, wherein, the first unit (8*h*) and the second unit (8*i*) are provided with contact portions (8*m*, 8*n*) that, in the connected state, contact with each other, the contact portions (8*m*, 8*n*) have a shape such that a separation movement of the units (8*h*, 8*i*) is only allowed in an axial direction of the roller (8), and the contact portion of one of the first and second units is in a form of a recess portion (8*m*) and the contact portion of another of the first and second units is in a form of a protruding portion (8*n*) having a corresponding shape as the recess portion (8*m*).

\* \* \* \* \*